United States Patent

Debrito

(10) Patent No.: US 7,734,929 B2
(45) Date of Patent: Jun. 8, 2010

(54) AUTHORIZATION METHOD

(75) Inventor: Daniel N. Debrito, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1619 days.

(21) Appl. No.: 10/836,726

(22) Filed: Apr. 30, 2004

(65) Prior Publication Data

US 2005/0246764 A1    Nov. 3, 2005

(51) Int. Cl.
*G06F 21/00*    (2006.01)
(52) U.S. Cl. .............................. 713/184; 726/5; 713/183
(58) Field of Classification Search ................ 713/184, 713/183; 726/5
See application file for complete search history.

(56) References Cited

U.S. PATENT DOCUMENTS

| | | | |
|---|---|---|---|
| 4,218,738 A | 8/1980 | Matyas et al. | |
| 4,479,112 A | 10/1984 | Hirsch | |
| 4,962,530 A | 10/1990 | Cairns | |
| 5,091,939 A | 2/1992 | Cole et al. | |
| 5,177,789 A | 1/1993 | Covert | |
| 5,323,146 A | 6/1994 | Glaschick | |
| 5,428,349 A | 6/1995 | Baker | |
| 5,432,851 A | 7/1995 | Scheidt et al. | |
| 5,434,918 A | 7/1995 | Kung et al. | |
| 5,465,084 A * | 11/1995 | Cottrell | 340/5.27 |
| 5,497,421 A | 3/1996 | Kaufman et al. | |
| 5,661,807 A | 8/1997 | Guski et al. | |
| 5,664,099 A | 9/1997 | Ozzie et al. | |
| 5,754,652 A | 5/1998 | Wilfong | |
| 5,778,065 A | 7/1998 | Hauser et al. | |
| 5,790,667 A | 8/1998 | Omori et al. | |
| 5,821,871 A * | 10/1998 | Benzler | 340/5.8 |
| 5,937,068 A | 8/1999 | Audebert | |
| 5,940,511 A | 8/1999 | Wilfong | |
| 5,949,348 A | 9/1999 | Kapp et al. | |
| 5,949,882 A | 9/1999 | Angelo | |
| 5,953,422 A | 9/1999 | Angelo et al. | |
| 6,006,328 A | 12/1999 | Drake | |
| 6,052,468 A | 4/2000 | Hillhouse | |
| 6,067,621 A * | 5/2000 | Yu et al. | 713/172 |
| 6,105,133 A | 8/2000 | Fielder et al. | |
| 6,141,751 A | 10/2000 | Ogawa | |
| 6,148,406 A * | 11/2000 | Weisz et al. | 726/18 |
| 6,189,096 B1 | 2/2001 | Haverty | |
| 6,195,698 B1 * | 2/2001 | Lillibridge et al. | 709/225 |
| 6,209,102 B1 | 3/2001 | Hoover | |
| 6,209,104 B1 * | 3/2001 | Jalili | 726/18 |
| 6,246,769 B1 * | 6/2001 | Kohut | 380/45 |
| 6,253,328 B1 * | 6/2001 | Smith, Jr. | 726/18 |
| 6,343,361 B1 * | 1/2002 | Nendell et al. | 713/171 |
| 6,434,702 B1 * | 8/2002 | Maddalozzo et al. | 726/17 |
| 6,493,235 B1 | 12/2002 | Barringer et al. | |

(Continued)

FOREIGN PATENT DOCUMENTS

JP    2001-352324    12/2001

*Primary Examiner*—David Garcia Cervetti

(57) ABSTRACT

An authorization method includes establishing a password for a user, wherein the password includes password characters in a defined order. The method further includes assigning a code character to each of the password characters at an authorization site, transmitting the code characters assigned to the password characters to a remote client and authorizing a user at the remote client upon entry of the code characters corresponding to the password characters in the defined order.

39 Claims, 6 Drawing Sheets

U.S. PATENT DOCUMENTS

| | | |
|---|---|---|
| 6,571,336 B1* | 5/2003 | Smith, Jr. ............ 713/184 |
| 6,662,300 B1 | 12/2003 | Peters |
| 6,668,321 B2* | 12/2003 | Nendell et al. ......... 713/169 |
| 6,747,676 B2* | 6/2004 | Botz et al. ............ 715/741 |
| 6,799,277 B2* | 9/2004 | Colvin ................ 726/22 |
| 6,895,514 B1* | 5/2005 | Kermani .............. 726/19 |
| 7,036,016 B1* | 4/2006 | Smith, Jr. ............ 713/185 |
| 7,079,670 B2* | 7/2006 | Pan et al. ............ 382/124 |
| 7,103,912 B2* | 9/2006 | Xia et al. ............. 726/8 |
| 7,149,899 B2* | 12/2006 | Pinkas et al. ......... 713/182 |
| 7,237,010 B2* | 6/2007 | Mora ................. 709/206 |
| 7,343,014 B2* | 3/2008 | Sovio et al. .......... 380/278 |
| 7,366,916 B2* | 4/2008 | Gentle et al. ......... 713/193 |
| 7,367,053 B2* | 4/2008 | Sanai et al. .......... 726/6 |
| 7,434,062 B2* | 10/2008 | Erez ................. 713/184 |
| 7,451,322 B2* | 11/2008 | Lee .................. 713/183 |
| 7,512,803 B2* | 3/2009 | Schaffer ............. 713/183 |
| 7,574,739 B2* | 8/2009 | Shirakawa ........... 726/19 |
| 2001/0005883 A1 | 6/2001 | Wray et al. |
| 2002/0070964 A1* | 6/2002 | Botz et al. ........... 345/741 |
| 2002/0129250 A1* | 9/2002 | Kimura .............. 713/172 |
| 2002/0133704 A1* | 9/2002 | Nendell et al. ........ 713/171 |
| 2002/0146127 A1 | 10/2002 | Wong |
| 2002/0191786 A1* | 12/2002 | Marroquin ........... 380/42 |
| 2002/0196274 A1* | 12/2002 | Comfort et al. ....... 345/741 |
| 2002/0197979 A1 | 12/2002 | Vanderveen |
| 2003/0005299 A1* | 1/2003 | Xia et al. ............ 713/171 |
| 2003/0051140 A1 | 3/2003 | Buddhikot et al. |
| 2003/0056096 A1* | 3/2003 | Albert et al. ......... 713/168 |
| 2003/0070074 A1 | 4/2003 | Geller et al. |
| 2003/0079042 A1 | 4/2003 | Yamanaka et al. |
| 2003/0110402 A1* | 6/2003 | Park ................. 713/202 |
| 2003/0154286 A1 | 8/2003 | Tang et al. |
| 2003/0172281 A1* | 9/2003 | Lee .................. 713/183 |
| 2003/0177392 A1 | 9/2003 | Hiltgen |
| 2003/0191946 A1 | 10/2003 | Auer et al. |
| 2003/0191949 A1 | 10/2003 | Odagawa |
| 2003/0198349 A1 | 10/2003 | Aizu et al. |
| 2003/0200177 A1 | 10/2003 | Kugai |
| 2003/0200433 A1 | 10/2003 | Stirbu |
| 2003/0204724 A1 | 10/2003 | Ayyagari et al. |
| 2003/0221102 A1 | 11/2003 | Jakobsson et al. |
| 2003/0223585 A1 | 12/2003 | Tardo et al. |
| 2003/0236980 A1 | 12/2003 | Hsu |
| 2004/0049685 A1* | 3/2004 | Jaloveczki ........... 713/182 |
| 2004/0062400 A1* | 4/2004 | Sovio et al. .......... 380/286 |
| 2004/0073813 A1* | 4/2004 | Pinkas et al. ......... 713/202 |
| 2004/0073815 A1* | 4/2004 | Sanai et al. .......... 713/202 |
| 2004/0123160 A1* | 6/2004 | Mizrah .............. 713/202 |
| 2004/0139331 A1* | 7/2004 | Sanai et al. .......... 713/184 |
| 2004/0168068 A1* | 8/2004 | Goal et al. ........... 713/184 |
| 2004/0225880 A1* | 11/2004 | Mizrah .............. 713/155 |
| 2004/0250139 A1* | 12/2004 | Hurley .............. 713/202 |
| 2004/0250141 A1* | 12/2004 | Casco-Arias et al. .... 713/202 |
| 2004/0257238 A1* | 12/2004 | De Jongh ........... 340/825 |
| 2005/0066186 A1* | 3/2005 | Gentle et al. ......... 713/193 |
| 2005/0071637 A1* | 3/2005 | Shirakawa ........... 713/170 |
| 2005/0071686 A1* | 3/2005 | Bagga et al. ......... 713/202 |
| 2005/0144484 A1* | 6/2005 | Wakayama .......... 713/202 |
| 2005/0160297 A1* | 7/2005 | Ogawa ............... 713/202 |
| 2005/0210107 A1* | 9/2005 | Mora ................ 709/206 |
| 2005/0235341 A1* | 10/2005 | Stieglitz et al. ........ 726/5 |
| 2005/0254650 A1* | 11/2005 | Sakurai et al. ........ 380/268 |
| 2006/0018467 A1* | 1/2006 | Steinmetz ........... 380/54 |
| 2006/0020815 A1* | 1/2006 | Varghese et al. ...... 713/182 |
| 2006/0026439 A1* | 2/2006 | Moseley ............. 713/184 |
| 2006/0031174 A1* | 2/2006 | Steinmetz ........... 705/67 |
| 2006/0036858 A1* | 2/2006 | Miura et al. .......... 713/170 |
| 2006/0112270 A1* | 5/2006 | Erez ................. 713/168 |
| 2007/0006301 A1* | 1/2007 | Nickell et al. ........ 726/22 |
| 2008/0216170 A1* | 9/2008 | Sanai et al. .......... 726/18 |

* cited by examiner

AUTHORIZATION METHOD

BACKGROUND

Many computerized systems prevent unauthorized access by requiring a person attempting to gain access to enter one or more passwords. In many applications, the passwords are entered via a keyboard. This may be especially dangerous at public usage terminals or other public remote clients where keystroke capturing software may be installed. By obtaining such passwords, unauthorized users may gain access to resources and sensitive information.

DETAILED DESCRIPTION OF THE EXAMPLE EMBODIMENTS

Figure 1:
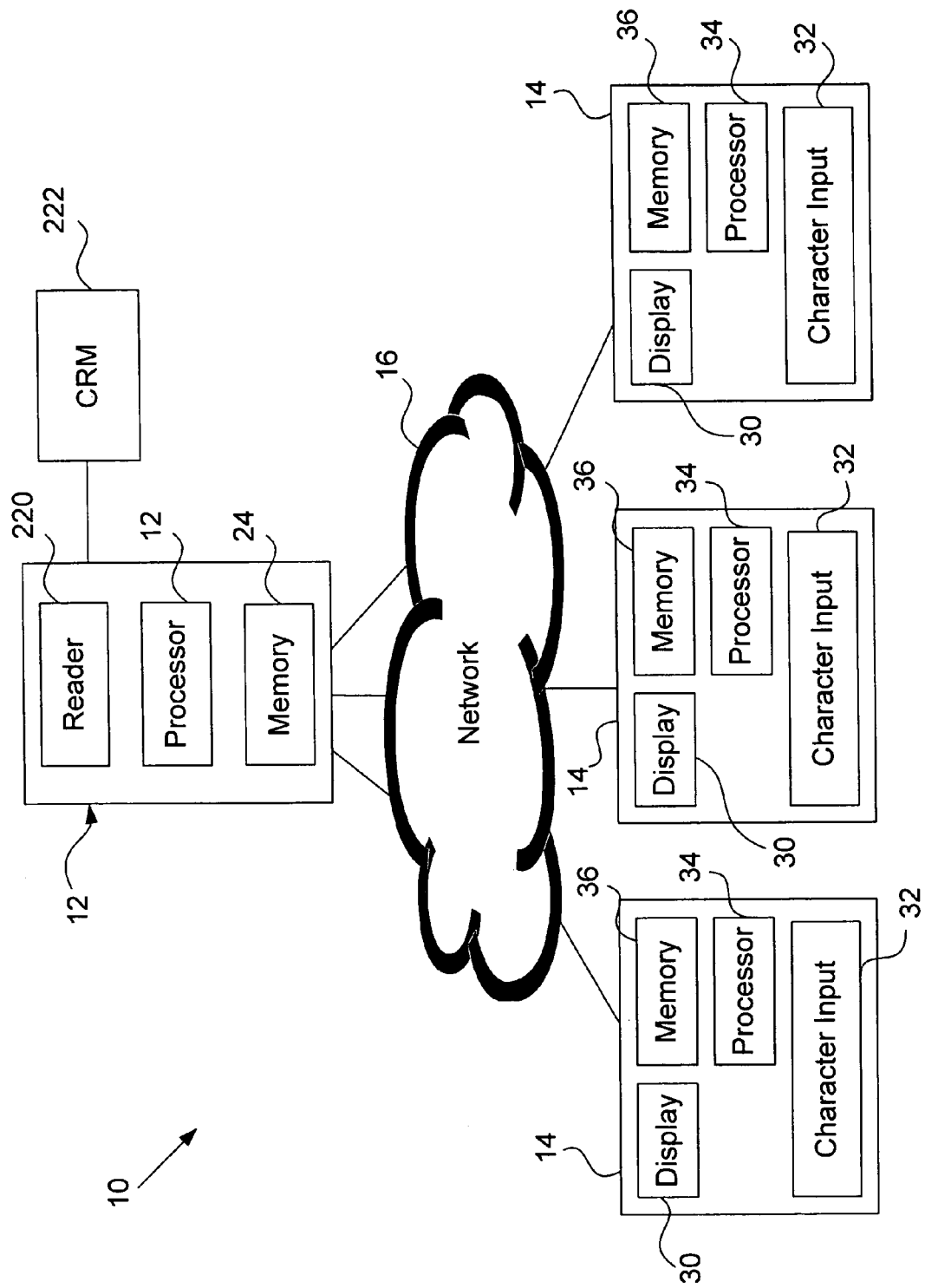
FIG. 1 is a schematic diagram illustrating one example of an authorization system of the present invention.

FIG. 1 is a schematic illustration of an authorization system 10 configured to use a password associated with a particular user. For purposes of this disclosure, the term "password" means any combination of characters in a defined order, utilized for accessing or denying access to a device, network, system and the like. The term "password" encompasses user names and other authorization codes. For purposes of this disclosure, the term "characters" includes alpha-numeric symbols, displays, icons, graphics and the like.

Figure 2:
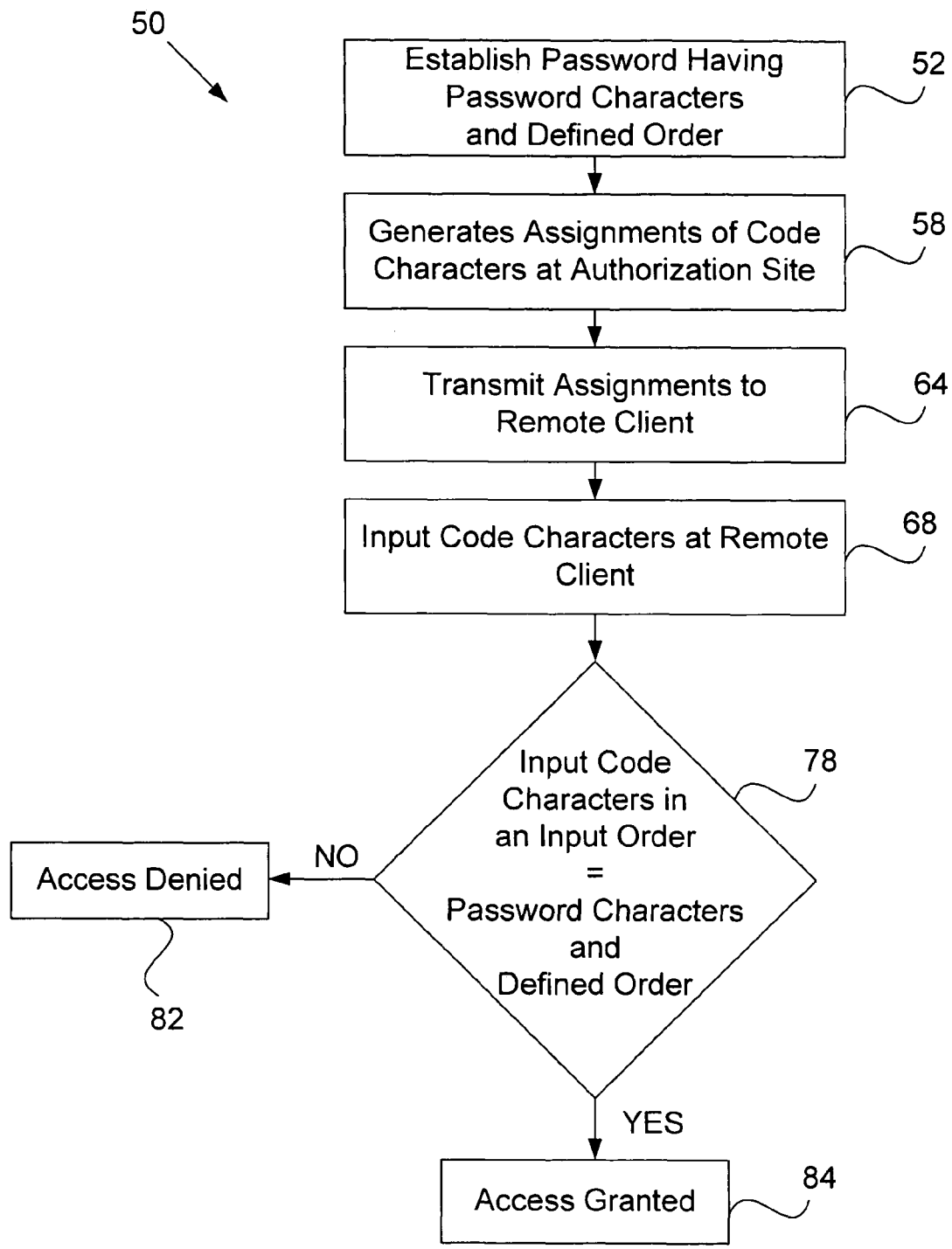
FIG. 2 is a flowchart illustrating one example of an authorization method performed by the authorization system of FIG. 1.
Figure 3:
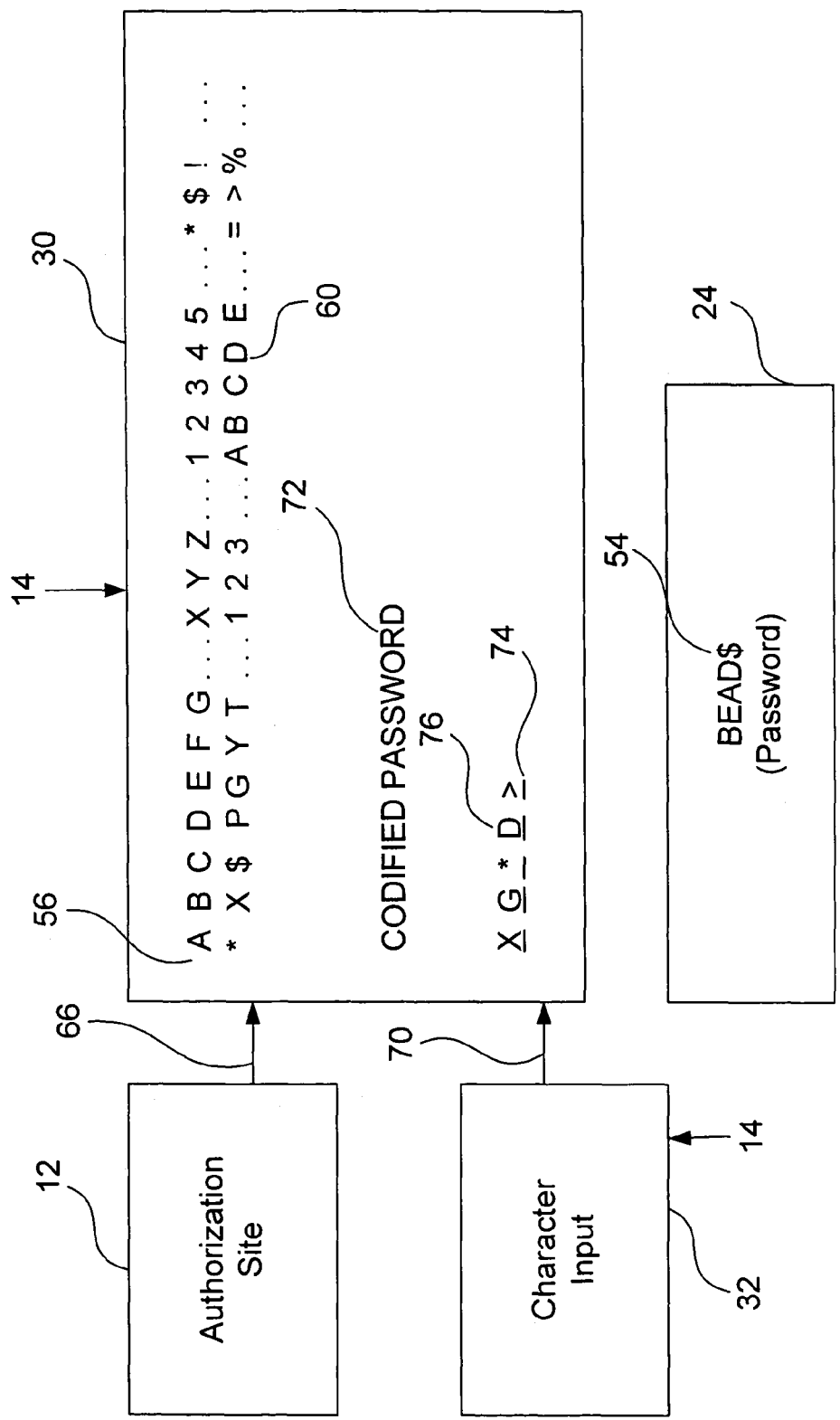
FIG. 3 is a schematic diagram illustrating portions of the authorization system of FIG. 1 performing the method of FIG. 2 according to one exemplary embodiment.

Authorization system 10 is configured to grant or deny authorization or access using an authorization method or scheme described hereafter with respect to FIGS. 2 and 3. As shown by FIG. 1, authorization system 10 generally includes authorization site 12 and remote clients 14. Authorization site 12 comprises a site generally removed from remote clients 14, but in communication with remote clients 14. In the particular embodiment illustrated, authorization site 12 communicates to remote clients 14 via a network 16. Network 16 allows two-way communication between site 12 and remote clients 14. Network 16 may use any of a variety of protocols such as Transmission Control Protocol/Internet Protocol (TCP/IP) network protocol, Digital Equipment Corporation NETwork protocol (DEC net), X.25, User Datagram Protocol (UDP) or other protocols. Network 16 may comprise any type of network, such as an internet, an Ethernet, a net-ware network or a private network (VPN). Network 16 may include a configuration such as wide area network (WAN), a wireless network or a local area network (LAN). Network 16 may provide communication via Hypertext Markup Language (HTML) web pages.

Authorization site 12 generally includes processor 18, reader 20, computer readable media 22 and memory 24. Processor 18, sometimes referred to as a controller, comprises a processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hardwired circuitry may be used in place of or in combination with software instructions to implement the functions described. Processor 18 is not limited to any specific combination of hardware circuitry and software, nor to any particular source for the instructions executed by the processing unit. In the particular embodiment shown, processor 18 generates control signals and processes information based at least in part upon instructions from computer readable media 22 received through reader 20.

Reader 20 comprises a device configured to read information and instructions contained on computer readable media 22. Computer readable media 22 comprises a portable medium containing instructions that are communicated to processor 18 by reader 20. Computer readable media 22 contains instructions that direct processor 18 to perform an authorization method as will be described in greater detail hereafter with respect to FIGS. 2 and 3.

In one embodiment, computer readable media 22 may comprise an optically encoded medium such as a compact disk (CD), digital versatile disk (DVD) and the like, wherein reader 20 is configured to read such optically encoded information. In another embodiment, computer readable media 22 may comprise a magnetically encoded medium such as a floppy disk, a tape and the like, wherein reader 20 is configured to read such magnetically encoded information. In still another embodiment, computer readable medium may comprise a hardwired digital device, such as a flash or other memory card, wherein reader 20 is configured to interact with the card for the transference of instructions. Computer readable media 22 enables the authorization scheme or method to be easily transferred between different authorization sites 12 and to be updated or replaced. In other embodiments, reader 20 and computer readable medium 22 may be omitted or utilized for other purposes, wherein site 12 includes a permanent medium containing instructions for executing the authorization scheme. In still other embodiments, reader 20 and computer readable medium 22 may be provided as part of one or more of remote clients 14, wherein instructions are transmitted to authorization site 12 through network 16. In still other embodiments, remote clients 14 may include permanent internal mediums providing such instructions for executing the authorization scheme.

Memory 24 comprises a medium configured to store information. Memory 24 may contain instructions for processor 18. Memory 24 may also store input or generated data relating to the authorization scheme. For example, memory 24 may store one or more passwords as well as assignments of code characters as described hereafter. Memory 24 may comprise random access memory (RAM), read only memory (ROM), a mass storage device or some other persistent storage.

Remote clients 14 generally comprise devices distinct from authorization site 12 and connected to authorization site 12 via network 16. Remote clients 14 comprise devices configured to interact with individuals or users. Examples of remote clients 14 include laptop computers, personal computers, printers, fax machines, personal digital assistants (PDA), cell phones, scanners, copiers, access terminals and the like. Each remote client 14 includes display 30, character input 32, processor 34 and memory 36. Display 30 generally comprises a device configured to display or otherwise communicate characters to an individual using remote client 14. In particular, display 30 may be configured to communicate the characters transmitted from authorization sites 12. Display 30 may also be configured to display characters input by the individual using character input 32. Display 30 may comprise a monitor, a screen, or other visual depiction device. In particular embodiments, display 40 may alternatively or additionally be configured to visually depict characters by printing such characters upon a print medium.

Character input 32 generally comprises a device configured to interact with a user of remote client 12 by permitting the user to input characters in a selected order. In one embodiment, character input 32 may comprise a keyboard. In another embodiment, character input 32 may comprise a touch pad. In still another embodiment, character input 32 may be incorporated as part of display 30, wherein character input 32 comprises a touch screen. In another embodiment, character input 32 may include a mouse or other selection device configured to be manipulated to move an arrow or other icon depicted on a screen to select or choose characters depicted on the screen. In lieu of comprising a manual input device, character input 32 may alternatively comprise an auditory input device employing voice recognition software. Overall, character input 32 enables a user of remote client 14 to input characters to gain authorization and access to either remote client 14, authorization site 12 or another site using the authorization method.

Processor 34 comprises a processing unit configured to generate control signals for the direction of display 30 and character input 32. In particular, processor 34 generates control signals which direct display 30 to communicate code characters to the person using remote client 14 code and to direct character input 32 to prompt the input of particular characters corresponding to the user's assigned password. In the particular embodiment shown, processor 34 generates such control signals based upon instructions contained in memory 36. Memory 36 may comprise random access memory (RAM), read only memory (ROM), a mass storage device or some other persistent storage. In alternative embodiments, processor 34 may generate control signals based upon instructions transmitted to remote client 14 from authorization site 12 through network 16.

FIG. 2 is a flowchart illustrating one example of an authorization method 50 performed by system 10 (shown in FIG. 1). FIG. 3 schematically illustrates interaction between authorization site 12 and one of remote clients 14 during the execution of method 50. As indicated by step 52 in FIG. 2, method 50 involves establishing a password for a particular user or individual. The password includes password characters 54 in a defined order. In one embodiment, password characters 54 are chosen or selected from a complete set of available characters 56. As a result, password characters 54 comprise a distinct subset of available characters 56. The establishment of the password characters and their defined order may be achieved by processor 18 randomly generating a password, by processor 18 generating a password for the user based upon certain defined variables or may be established or chosen by the user.

FIG. 3 illustrates one example of such a password, BEAD$. In the particular example shown in FIG. 3, the actual password characters are B, E, A, D, $ in the noted order with B proceeding E, E proceeding A, A proceeding D and D proceeding $. As indicated in FIG. 3, the password established for a particular user is stored in memory 24 of authorization site 12. In other embodiments, the password may be stored in memory 36 of one or more of remote clients 14 or may be stored in memory at an additional site, wherein the memory at the additional site is accessed by authorization site 12 or remote client 14.

As indicated by step 58 in FIG. 2, code characters are assigned to the password characters at authorization site 12. In particular embodiments, the code characters may be of the same general type of characters or symbols as the password characters or may comprise distinct types of characters or symbols. FIG. 3 illustrates code characters 60. As shown by FIG. 3, a code character 60 is assigned to each password character 54. In the particular embodiment illustrated, at least one code character 58 is assigned to each available character 56 at authorization site 12. For example, in the particular example shown in FIG. 3, code character "*" is assigned to available character "A" which is also a password character 54. Code character "%" is assigned to available character "!" which is an available character 54 but which is not a password character 54.

Figure 4:
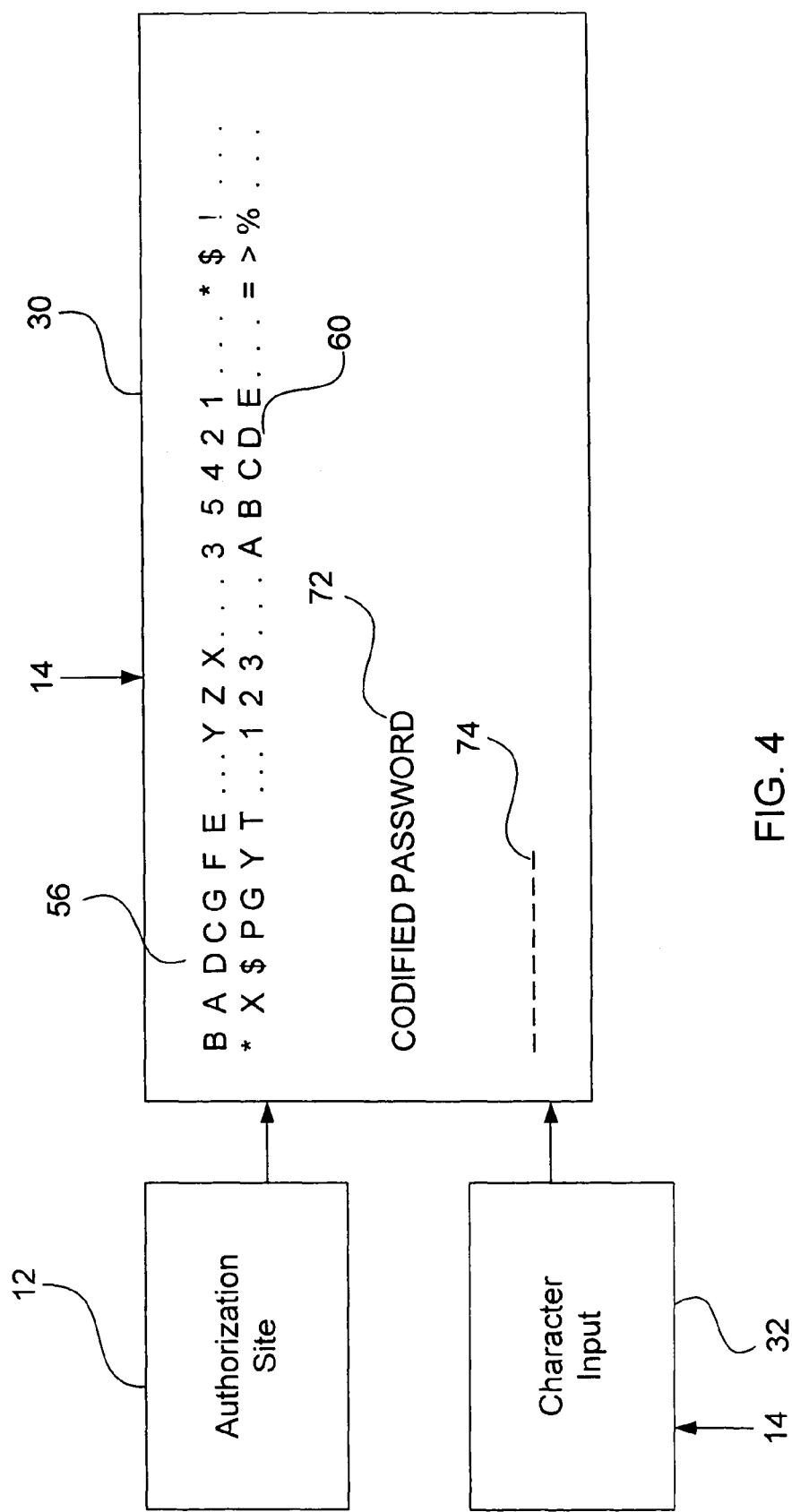
FIG. 4 is a schematic diagram illustrating portions of the system of FIG. 1 performing another embodiment of the method of FIG. 2 according to one exemplary embodiment.

As indicated by step 64 in FIG. 2 and by arrow 66 in FIG. 3, the assignments of the code characters are transmitted to one or more of remote clients 14. In response to receiving the code character assignments, processor 34 at remote client 14 generates control signals causing display 30 to communicate the code assignments to the user. For example, as shown by FIG. 3, display 30 may be used to visually depict each of available characters 56 and their corresponding code characters 60. Although display 30 is illustrated as communicating the assignments by visually depicting the code character 60 below its assigned available character 56, this relationship between available characters 56 and code characters 60 may be expressed in alternative fashions as well. For example, the available characters 56 and code characters 60 may be visually depicted upon display 30 in other relative positions. In particular embodiments, display 30 may be configured such that selection or clicking of a particular available character 56 causes display 30 to also bring up or display an assigned code character 60 or vice-versa. Although display 30 is illustrated as visually depicting the entire set of available characters 56, display 30 may alternatively be directed by processor 34 (shown in FIG. 1) to visually depict only a portion of available characters 56 and their respective assigned code characters 60. In other embodiments, the display of available characters 56 may be omitted, wherein the mere depiction of code characters 60 in a particular order implies or otherwise communicates those available characters 56 to which each code character 60 is assigned. For example, a user may be informed that a listing of code characters 60 is to correspond to a predefined order of available characters 56 such as the natural order of the alphabet or numerals. For example, the code character "X", being the second listed code character 60, may be automatically assumed to correspond to the second letter of the alphabet, "B". As shown in FIG. 4, in other embodiments, the order of available characters 56 and their assigned code characters 60 may be random or varied so as to not follow any predefined or natural order.

As indicated by steps 68 in FIG. 2 and arrow 70 in FIG. 3, a person at remote client 14 inputs or enters code characters utilizing character input 32. In one particular embodiment, processor 34 at remote client 30 or processor 18 at authorization site 12 may generate control signals causing display 30 to additionally prompt or request the user to enter those code characters assigned to the password character in the defined order of the password characters. For example, FIG. 3 illustrates one method wherein display 30 depicts a prompt 72, "codified password", proximate to an input display area 74. In the particular example shown, input display area 74 comprises a series of lines, each line requesting input of a code character. Although the number of blanks shown in FIG. 3 corresponds to the number of password characters, input display area 74 may alternatively include a greater number of such blanks which will not be utilized. In still other embodiments, input display area 74 may comprise a box or use a portion of display 30. In still other embodiments, display 30 may request or prompt entry of the codified password by other communication mechanisms such as light-emitting diodes proximate to preprinted instructions, verbal or auditory requests and the like. In other embodiments, the prompting of an input of the codified password may be omitted.

Code characters 60 are entered or input via character input 32. Such input may be made by manually depressing character-associated keys on a keyboard, by manually depressing character associated keys on a keypad, by selecting characters on a screen by manipulating a mouse or other selection device or by audibly saying or speaking code characters into a microphone. In the particular embodiment illustrated, as code characters 60 are input and received by processor 34 or processor 18, control signals are generated by either processor 34 or processor 18 (transmitting such control signals through network 16) which further causes display 30 to visually depict the entered code characters 76 and their input order. In the example shown in FIG. 3, the user has entered the code character "X" which corresponds to the password character "B", followed by the code character "G" which corresponds to the password character "E", followed by the code character "*" which corresponds to the password character "A", followed by the code character "D" which corresponds to the password character "D" and followed by the code character ">" which corresponds to the password character "$". These input code characters 76 in the noted order are displayed at input display area 74. In other embodiments, the display of input code characters 76 may be omitted or may be represented by generic symbols (such as by asterisks) indicating the number of input code characters 76 and not their identity.

As indicated by step 78 in FIG. 2, input code characters 76 and their input order are compared with the password characters 54 and their defined order stored in memory 24 (as shown in FIG. 3), stored in memory 36 or stored at other memory location. In one embodiment, the input code characters 76 and the input order are transmitted by remote client 14 to processor 18 at authorization site 12. Processor 18 accesses either memory 24, memory 36 or other memory locations via network 16 to obtain the stored password characters 54 and their defined order. Processor 18 compares the password characters 54 and their defined order with the input code characters 76 and the input order. In particular, the comparison is made by processor 18 translating the input code characters to their corresponding available characters based upon the code character assignments. The translated code characters and their input order are compared to the password characters and their defined order. Alternatively, the comparison may be made by processor 18 translating each of the established password character to their corresponding code characters and comparing the translated password characters and their defined order to the input code characters and their input order. In another embodiment, processor 34 at remote client 14 accesses memory 36, memory 24 or other memory location via network 16 to obtain stored password characters 54 and their defined order and compares the password characters 54 and their defined order with the input code characters 76 and their input order.

As indicated by step 82 in FIG. 2, if the input code characters 76 and the input order do not equal the password characters 54 and the defined order, access to the use of remote client 14, a particular function provided by remote client 14, another service or site, or a particular option provided by the other service or site is denied. As indicated by step 84 in FIG. 2, if the input code characters 76 and their input order equals the password characters 54 and the defined order, access to the requested service or function is granted. In one embodiment, the denial or granting of access may be communicated to the user at remote client 14. In particular, processor 18 or processor 34 may be configured to generate control signals causing display 30 to communicate the denial or grant of access. Such communication may be by visually depicting characters or by verbal or auditory signals or words. In still other embodiments, the grant or denial of access may not be communicated. In particular embodiments, the denial of access as indicated by step 82 may cause processor 18 or processor 34 to once again prompt the user to re-enter the codified password.

Overall, authorization system 10 and method 50 employed by authorization system 10 provide a security system enabling a user to input his or her password with reduced risk of others obtaining the user's password. For example, in those embodiments where character input comprises a keyboard or keypad, any keystroke capturing software merely captures the code characters and their input order, not the actual password characters and the defined order. Because the assignment of code characters is frequently changed by authorization site 12, the captured code characters and the input order do not allow others to obtain the password and to gain unauthorized access. Because the assignment of code characters is performed at authorization site 12, which is remote from remote client 14, the assignment of code characters and the security of system 10 is enhanced. In those embodiments in which character input 32 comprises a microphone or other auditory input means, another person overhearing the verbal input of such code characters does not obtain password characters or their defined order. Once again, because authorization site 12 frequently generates new assignments of code characters, other persons overhearing such code characters during an access request by the user do not later obtain unauthorized access later using the same code characters and their previous input order.

Figure 5:
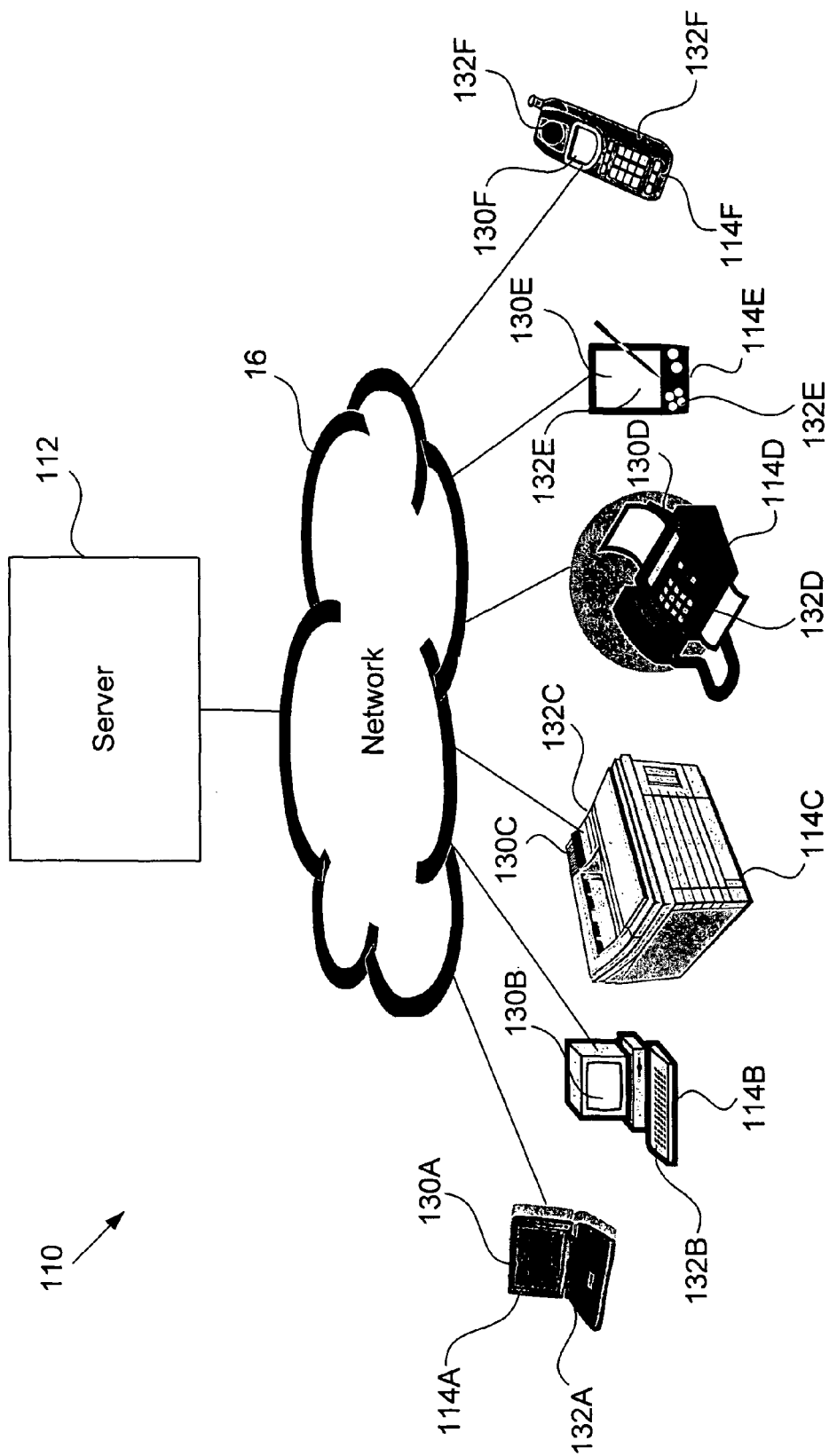
FIG. 5 is a schematic diagram illustrating a specific example of the system of FIG. 1.

FIG. 5 schematically illustrates authorization system 210, a specific example of authorization system 10 (shown in FIG. 1). Authorization system 210 includes service site 112 and remote clients 114A-114F which are in communication with service site 112 via a network 16. Service site 112 provides services to remote clients 114. In the particular embodiment shown in FIG. 5, service site 112 comprises a server which includes processor 18 and memory 24 (shown in FIG. 1).

Remote clients 14A-114F comprise distinct types of remote clients which communicate with service site 112. Each remote client 114 includes a display 130A, a character input 132A and an internal processor and memory (not shown). Remote client 114B comprises a desktop or personal computer including a display 130B, a character input 132B and an internal memory and processor (not shown). Remote client 114C comprises a printer having a display 130C, a character input 132C and an internal processor and memory (not shown). Remote client 114D comprises a fax machine having a display 130D, a character input 132D and an internal processor memory (not shown). Remote client 114E comprises a personal digital assistant (PDA) having a display 130E, character inputs 132E including both a touch pad and a touch screen and an internal memory and processor (not shown). Remote client 114F comprises a cell phone having a display 130F, character inputs 132F, including one or both of keypad or a microphone for receiving verbal input, and an internal processor and memory (not shown).

With each of the remote clients 14A-114F, a person inputs a codified password based upon an assignment of code characters transmitted to each remote client 114A-114F from the server functioning as authorization site 112. If the code characters and input order of the code characters matches the stored password characters and their defined order, access to use of the remote client 114A-114F or access to the services provided from authorization site 112 or other sites, such as other servers, is granted.

Figure 6:
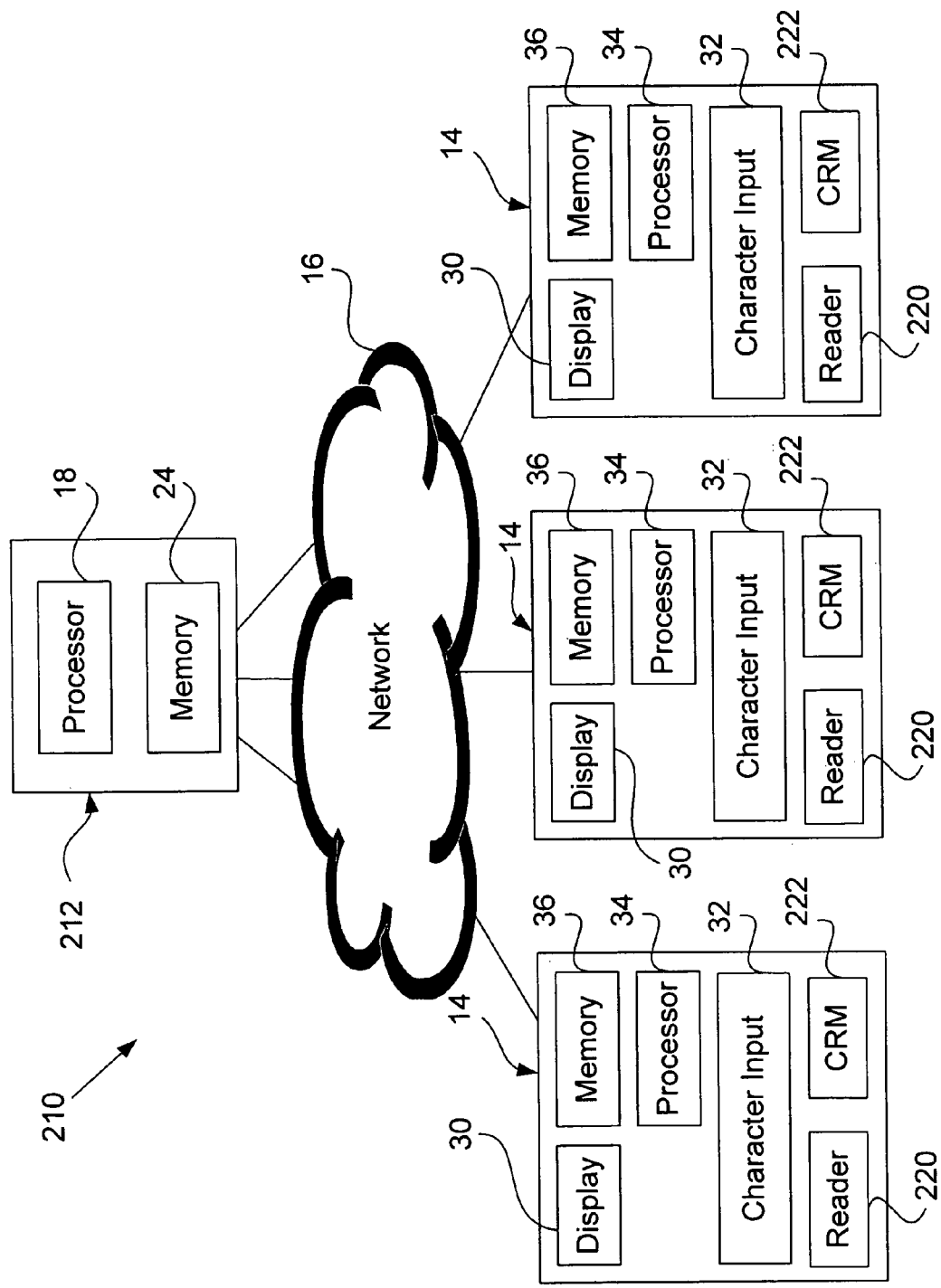
FIG. 6 is a schematic diagram illustrating another embodiment of the authorization system of FIG. 1 according to another exemplary embodiment.

FIG. 6 schematically illustrates authorization system 210, another embodiment of authorization systems 10 and 110 shown in FIGS. 1-5. Authorization system 210 is similar to authorization system 10 except that system 210 replaces authorization site 12 with authorization site 212 which omits reader 20 and computer readable medium 22. Each remote client 14 additionally includes reader 220 and computer readable medium 222. Reader 220 and computer readable medium 222 are similar to reader 20 and computer readable medium 22 described with respect to authorization system 10 except that such components are provided at each remote client 14. Like computer readable medium 22, computer readable medium 222 contains instructions for implementing an authorization scheme or method. Because reader 220 and computer readable medium 222 are associated with each remote client 14, rather than authorization site 12, computer readable medium 222 directs processor 34 to perform substantially all of the codification and translation steps, isolating or buffering authorization site 212 from the codification translation process. In particular, computer readable medium 222 directs processor 34 to generate assignments of code characters, to prompt the input of code characters at remote client 14 and to translate the input code characters to their corresponding available characters based upon the assignment of code characters. The translated code characters are then transmitted to authorization site 212, where they and their input order are compared to the established password characters and their defined order to determine whether access should be granted or denied. In short, the translation between available characters and code characters is done in a manner at each remote client 14 which does not affect or require modifications to or specific actions by authorization site 212.

Although each remote client 114 is illustrated as including reader 220 and computer readable medium 222 for providing processor 34 of each remote client 14 with instructions for carrying out the authorization method, in other embodiments, each remote client 14 may alternatively include such instructions stored in memory 36 for carrying out the authorization method. In such other embodiments, reader 220 and computer readable medium 222 may be omitted. Although comparison of the translated code characters and established password characters are described as being performed at processor 18 of authorization site 212, such comparisons may alternatively be made by processor 34 at each remote client 14. In other embodiments, authorization site 212 may still include reader 20 and computer readable medium 22 configured for providing other functions.

Although the present invention has been described with reference to example embodiments, workers skilled in the art will recognize that changes may be made in form and detail without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. Because the technology of the present invention is relatively complex, not all changes in the technology are foreseeable. The present invention described with reference to the example embodiments and set forth in the following claims is manifestly intended to be as broad as possible. For example, unless specifically otherwise noted, the claims reciting a single particular element also encompass a plurality of such particular elements.

What is claimed is:

1. An authorization method comprising:
establishing a password for a user, the password including password characters in a defined order;
assigning a code character to each of the password characters at an authorization site;
transmitting the code characters assigned to the password characters to a remote client; and
authorizing a user at the remote client upon entry of the code characters corresponding to the password characters in the defined order.

2. The method of claim 1, wherein the authorization site is a server.

3. The method of claim 2, wherein the remote client is selected from a group of devices including:
laptop, a personal computer, a printer, a fax machine, a personal digital assistant (PDA), a cell phone, a scanner, a copier, and an access terminal.

4. The method of claim 1, wherein the password characters comprise a portion of available characters.

5. The method of claim 4 including assigning a code character to each of the available characters.

6. The method of claim 5 including transmitting the code characters corresponding to the available characters which are not password characters to the remote client.

7. The method of claim 6 including:
transmitting the password characters to the remote client; and
identifying to the user at the remote client the code characters assigned to each available character.

8. The method of claim 1, wherein the password characters are alpha-numeric symbols.

9. The method of claim 8, wherein the code characters are alpha-numeric symbols.

10. The method of claim 1, wherein the code characters are alpha-numeric symbols.

11. The method of claim 1, wherein the code characters are randomly assigned to the password characters.

12. The method of claim 11, wherein the code characters are randomly assigned to the password characters for each authorization request.

13. The method of claim 1 including:
transmitting characters to the remote client; and
identifying to the user at the remote client the code characters assigned to each password character.

14. The method of claim 1, wherein the password is a random order of password characters.

15. The method of claim 1, wherein the code characters are transmitted across a network.

16. The method of claim 1 including prompting a user to enter code characters corresponding to the password characters in the defined order.

17. The method of claim 1 including transmitting user entered code characters and the order of the user entered code characters from the remote client to the authorization site.

18. The method of claim 17 including evaluating the user entered code characters, the password characters, the defined order of the password characters, the code characters assigned to each of the password characters and an order of the entered code characters.

19. The method of claim 1 including evaluating entered code characters, an order of the entered code characters, the password characters, the defined order of the password characters, and the code characters assigned to each of the password characters.

20. The method of claim 1 including storing the password at the authorization site.

21. The method of claim 1, wherein the authorizing of the user at the remote client is upon manual entry by the user of the code characters corresponding to the password characters in the defined.

22. A computer readable medium comprising:
executable instructions configured to:
direct an authorization site to:
assign a code character to each of password characters from which a password may be established; and
transmit the code characters assigned to the password characters to a remote client;
executable instructions configured to direct the remote client to:
display the code characters assigned to each of the password characters to a user at the remote client; and
prompt the user to enter the code characters corresponding to the password characters in a defined order; and
executable instructions configured to direct one of the authorization site and the remote client to evaluate the entered code characters, the order of the entered code characters, characters of a password assigned to or established for the user, an order of the characters of the password established for the user, and the code characters assigned to each of the password characters.

23. The computer readable medium of claim 22 including: executable instructions configured to:
direct the authorization site to assign a code character to each of the available characters, a portion of which are password characters; and
transmit the code characters corresponding to the available characters which are not password characters to the remote client; and
executable instructions configured to direct the remote client to display the code characters corresponding to the available characters which are not password characters.

24. The medium of claim 22 including:
executable instructions configured to direct the remote client to transmit user entered code characters and the order of the user entered code characters to the authorization site; and
executable instructions configured to direct the authorization site to evaluate the user entered code characters, the order of the user entered code characters, the password characters, the defined order of the password characters, and the assignment of the code characters to each password character.

25. The medium of claim 22, wherein the executable instructions are configured to direct the authorization site to establish the password for the user.

26. The medium of claim 22 including executable instructions configured to direct the authorization site to randomly assign the code characters to the password characters.

27. The medium of claim 22, wherein the medium is configured to be read by a sensing device associated with the authorization site, wherein executable instructions for directing the remote client are transmitted to the remote client.

28. The medium of claim 22, wherein the medium is configured to be read by a sensing device associated with the remote client, wherein executable instructions for directing the authorization site are transmitted to the remote client.

29. The medium of claim 22, wherein the medium includes:
a first portion configured to be read by a first sensing device of the authorization site and including the executable instructions configured to direct the authorization site; and
a second portion configured to be read by a second sensing device of the remote client and including the executable instructions configured to direct the remote client.

30. An authorization system using a user assigned password having password characters in a defined order, the system comprising:
an authorization site; and
remote clients in communication with the authorization site;
wherein the authorization site is configured to assign a code character to each password character and is configured to transmit the assigned code characters to the remote clients;
wherein each remote client is configured to communicate the code characters to a user and is configured to prompt the user to input the code characters assigned to the password characters in the defined order; and
wherein at least one of the authorization site and each of the remote clients is configured to grant or deny access to the user based upon the user input code characters, an order of the user input code characters, the password characters, the defined order of the password characters and the assignment of the code characters to the password characters.

31. The system of claim 30, wherein the authorization site is configured to assign a code character to each of the available characters, wherein the password characters comprise a portion of the available characters, wherein the authorization site is configured to transmit the code characters corresponding to the available characters which are not password characters to the remote client and wherein the remote client is configured to identify to the user at the remote client the code characters assigned to the available characters which are not password characters.

32. The system of claim 30, wherein the remote client is configured to transmit the user input code characters in the input order to the authorization site and wherein the authorization site is configured to evaluate the user input code characters and the input order of the code characters.

33. The system of claim 30, wherein the authorization site includes a memory configured to store the user assigned password.

34. The system of claim 30, wherein the remote client includes a character input device.

35. The system of claim 30, wherein the remote client includes a display configured to show the assignment of the code characters to the password characters.

36. The system of claim 30 including a network providing communication between the authorization site and the remote clients.

37. The system of claim 30, wherein the remote client is selected from a group of devices including:
laptop, a personal computer, a printer, a fax machine, a personal digital assistant (PDA), a cell phone, a scanner, a copier, and an access terminal.

38. The system of claim 37, wherein the authorization site includes at least one server.

39. An authorization system using a user assigned password having password characters in a defined order, the system comprising:

an authorization site;

remote clients in communication with the authorization site;

means at the authorization site for creating an assignment of code characters to each of the password characters;

means for transmitting the assignment from the authorization site to at least one of the remote clients;

means at the remote client for communicating the assignment to a user;

means at each remote client for receiving an input of code characters from the user in an input order; and means for evaluating the password characters, the defined order of the password characters, the input code characters, the input order of the code characters and the assignment of the code characters to the password characters.

\* \* \* \* \*